Sept. 11, 1962  R. L. ANDERSON  3,052,958
METHOD OF MAKING A PERMANENT MAGNET ROTOR
Filed May 2, 1957  2 Sheets-Sheet 1
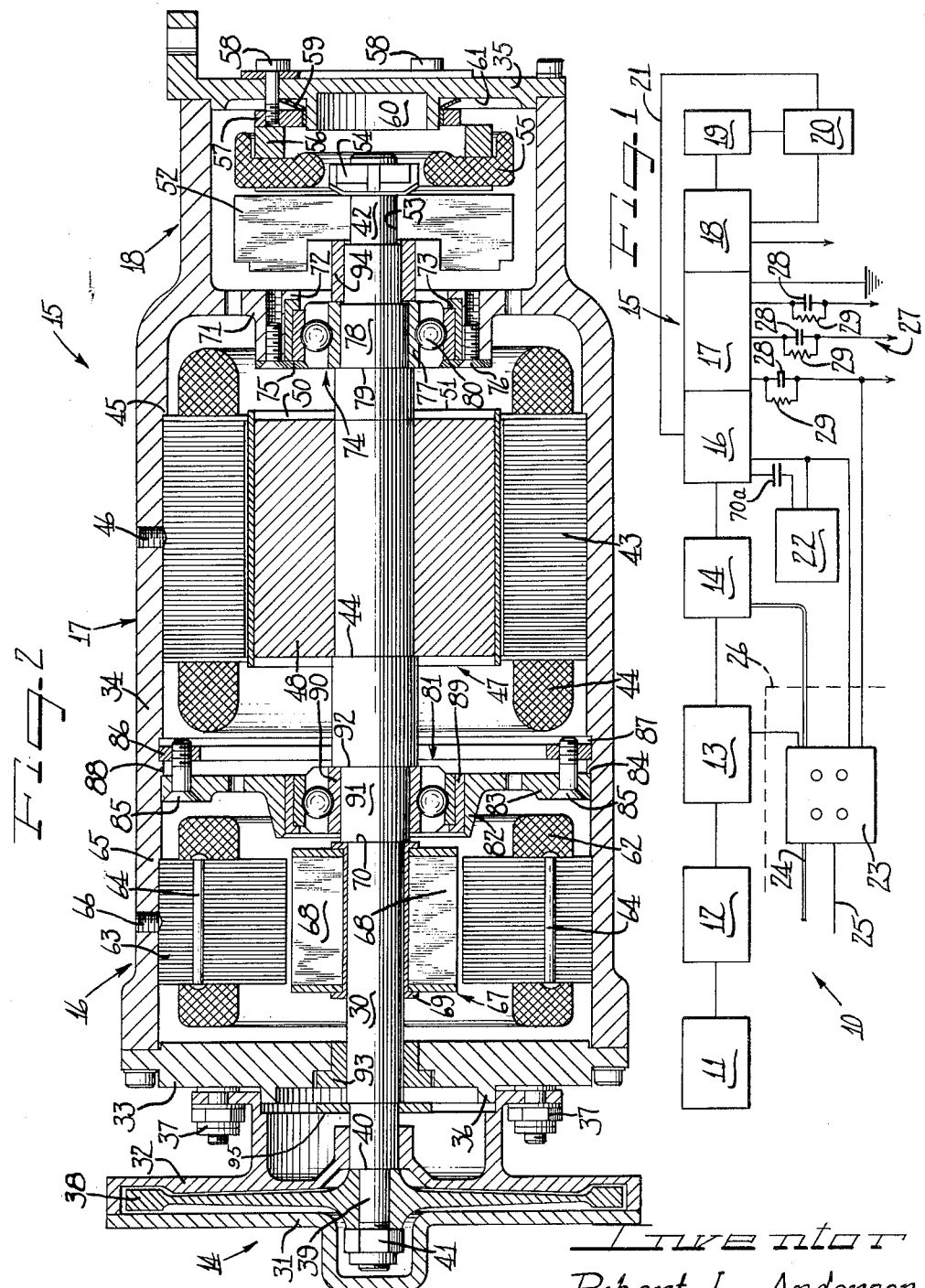
Inventor
Robert L. Anderson Sept. 11, 1962 R. L. ANDERSON 3,052,958
METHOD OF MAKING A PERMANENT MAGNET ROTOR
Filed May 2, 1957 2 Sheets-Sheet 2
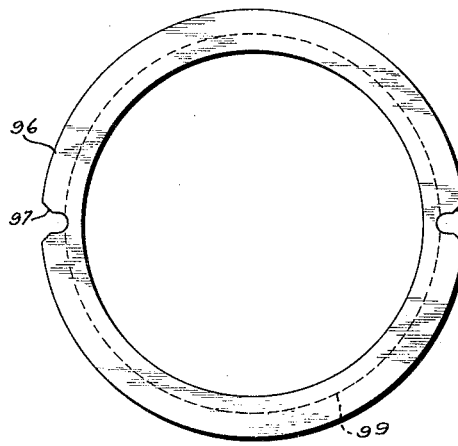
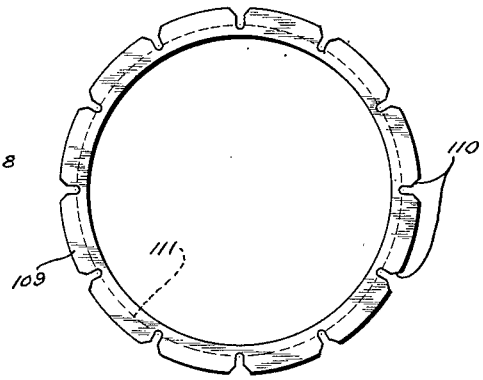
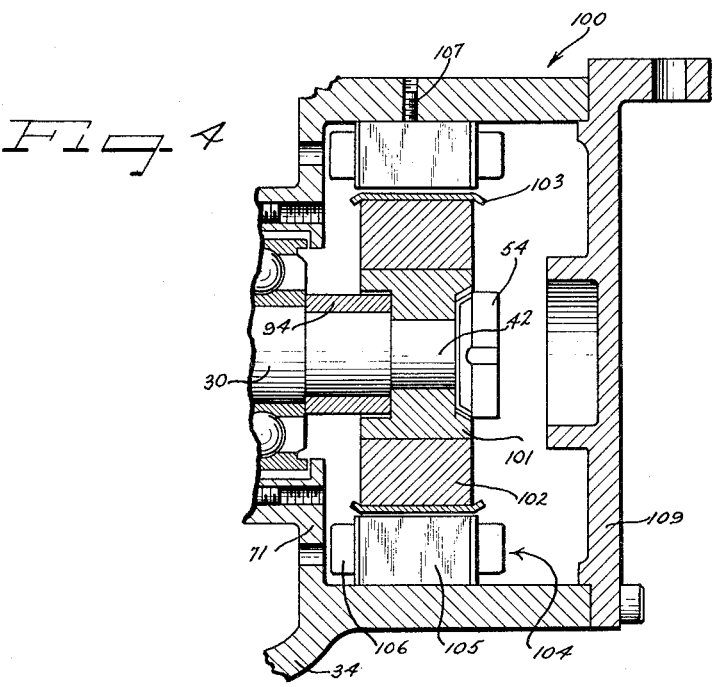
Inventor
Robert L. Anderson United States Patent Office 3,052,958
Patented Sept. 11, 1962

3,052,958
METHOD OF MAKING A PERMANENT
MAGNET ROTOR
Robert L. Anderson, Rocky River, Ohio, assignor to
Thompson Ramo Wooldridge Inc., a corporation of
Ohio
Filed May 2, 1957, Ser. No. 656,646
1 Claim. (Cl. 29—155.53)

This invention relates to an alternator assembly which is particularly designed for use in various types of aircraft such as airplanes, rockets, missiles, etc., although various features of the invention may have general application.

In any alternator system, and particularly in aircraft systems, it is desirable to have the highest possible ratio of power output to weight or size, it is desirable to have stable, reliable, trouble-free, and efficient operation and it is, of course, desirable to provide an assembly which is easily and economically manufacturable. It is therefore the general object of this invention to provide an alternator assembly having these desirable features.

A feature of this invention is in the provision of an alternator system operable at an extremely high speed so as to obtain a high ratio of power output to size and weight, and also to permit use of the turbine which by operating at a high speed has a very small size compared to the power output thereof.

A further feature of this invention is in the stabilization of alternator operation by controlling the loading of the turbine or other motive power source used which has a speed decreasing with load. This is preferably accomplished electrically and most preferably by means of an auxiliary alternator which preferably forms a parasitic load. It is found that with this arrangement, stable operation is reliably obtained, and with a compact, low weight arrangement.

Another feature of the invention is in the manner in which the main and auxiliary alternators are arranged relative to each other.

A still further feature of the invention is in the arrangement in which the alternator assembly is arranged relative to the turbine.

Yet another feature of the invention is in the construction of the alternator rotors, and in a method of forming the rotors.

This invention contemplates other objects, features and advantages which will become more fully apparent from the following detailed description taken in conjunction with the accompanying drawings which illustrate preferred embodiments and in which:

FIGURE 1 is a schematic block diagram of a complete power generating and control system utilizing a turbine and alternator assembly constructed in accordance with the principles of this invention;

FIGURE 2 is a sectional view of the turbine and alternator assembly used in the system of FIGURE 1;

FIGURE 3 is a side elevational view of a sleeve member as used in forming a sleeve for the main alternator rotor of the assembly of FIGURE 2;

FIGURE 4 is a view illustrating a modified form of control alternator; and

FIGURE 5 is a side elevational view of a sleeve member which is used in forming a sleeve which is preferably although not necessarily used with the rotor of the modified control alternator of FIGURE 4.

Reference numeral 10 generally designates a complete power generating and control system utilizing a turbine and alternator assembly constructed in accordance with the principles of this invention.

In the system 10, a combustible fuel is fed from a fuel supply 11 through a control valve 12 to a gas generator or reaction chamber device 13. High pressure gases from the generator 13 are fed to a turbine 14 which drives an alternator assembly 15 including a parasitic load alternator 16, a primary or main load alternator 17 and a control alternator 18.

The control alternator 18 supplies a speed or frequency signal to a frequency discriminator 19 which develops an output signal having a polarity and amplitude corresponding to any difference between the speed or frequency of the alternators and the desired speed or frequency. This signal is fed to a magnetic amplifier 20 which may be powered from the control alternator 18 and supplies a control signal to a field winding of the parasitic alternator 16, as diagrammatically indicated by line 21.

The parasitic alternator is connected to a load 22. The system so functions that if, for example, the speed of operation of the alternators should increase, the parasitic alternator 16 is so controlled as to supply additional power to the load 22, to reduce the speed of operation. The turbine or other source of motive power must, of course, be such that its speed of operation is decreased when the load is increased. If the speed should decrease, the parasitic alternator 16 is so controlled as to supply a decreased amount of power to the load 22, to allow the speed to increase to the desired value.

It may be noted that this system of control requires ample energy to maintain sufficient parasitic load level as bias which in itself is not an advantage but the end results of the system such as fast frequency response, high sensitivity, reliability and trouble-free operation more than compensate for this additional level of input power.

The system 10 of FIGURE 1 also includes a ground testing and starting control system indicated generally by the box 23 having connections to an outside source of pneumatic energy through a pipe or tube 24 and to an outside source of electrical energy over a line 25. The appropriate connections are made to the gas generator 13 for firing the system and starting the same, to the turbine 14, and to the parasitic and main alternators for overspeed controls and test determinations. This unit 23 may stay on the ground when the craft carrying the remainder of the assembly takes off and in the drawing, broken or dashed line 26 indicates the separation between the control 23 and the remainder of the system. Quick disconnect couplings are, of course, provided between the control 23 and the remainder of the system.

The primary or main alternator 17 is a three-phase, 400 cycle grounded type and according to an alternate specific feature of this invention, a passive network 27 is provided to obtain excellent voltage regulation. The network 27 comprises capacitors 28—28—28 respectively placed in series with each of the three lines leading from the alternator 17. Resistors 29—29—29 are respectively placed across the capacitors 28—28—28 to provide a bleeder operation reducing high voltages in capacitors during short circuit tests. The bleeder resistors also provide a regulating action and trim for the full load voltage performance.

The main alternator 17 is preferably operated at a high rate of speed to obtain a maximum ratio of power output to size and weight, and is preferably operated at 24,000 r.p.m., having two poles to develop the 400 cycle electrical output. Operation at high speeds has a further advantage in that it permits effective use of a turbine which may be operated at a very high rate of speed to obtain high efficiency and also to develop a high power output compared to the size and weight thereof. According to an important feature of the invention, the turbine 14 and the main alternator 17 are mounted in compact assembly and operate on a common shaft 30.

It is a further feature of the invention that the parasitic load alternator 16 and the control alternator 18 also operate on the common shaft 30.

The turbine 14 has a housing including a pair of shell parts 31 and 32, and the alternator assembly 15 has a housing including an end plate 33 adjacent the turbine, a cylindrical shell 34 and an end plate 35 at the opposite end of the assembly. The shell part 32 of the turbine housing has a sleeve portion which is recessed to slip over an annular projection 36 on the end plate 33 and has a flange portion secured to the end plate 33 by bolts 37.

The turbine 14 includes a rotor 38 which is slipped on a reduced diameter portion 39 of the shaft 30 to abut a shoulder 40, and a nut 41 is then screwed on the end of the shaft 30 to lock the rotor in position.

The main or primary alternator 17 is a permanent magnet type alternator and comprises a stator 43 having prewound coils inserted into insulated slots of 24 slot laminated iron stack. The coils are systematically and symmetrically placed and connected by welding, using gas flame, to other coils and four leads. The stator laminations are indicated by reference numeral 43, and the coils by reference numeral 44. The outside diameter of the stator laminations is substantialy equal to the inside diameter of the shell 34, and in assembly, the stator is slipped in the housing to engage a shoulder 45 in the housing, and is then locked in place by means of a set screw 46 threaded through the wall of the housing.

The rotor of the primary or main alternator 17 is indicated generally by reference numeral 47 and includes an alnico VI cylindrical magnet 48 fixed on the shaft 30 against a shoulder 49 thereon and temperature contracted into position. Surrounding the two pole magnet 48 is a sleeve including a pair of semi-cylindrical iron pole shoes 50 and 51 which are welded together by a material which provides nonmagnetic gaps therebetween, preferably with an austenitic weld, the center lines of the pole shoes 50 and 51 being aligned with the centerlines of the magnet poles to obtain maximum flux transfer. The manner in which the sleeve is made forms an important feature of the invention and will be described in detail hereinafter. The sleeve reduces the effect of open-circuit effects on the coercive force of the alnico magnet, assists in reducing the effect of short circuit demagnetization and provides a suitable covering to prevent particles from the rotor magnet from emitting at high speeds and damaging the alternator. Other advantages to the sleeve are its adaptability to being used as subject of a balancing operation and its ability to be plated for environmental protection.

A signal from the main alternator 17 could be fed to the frequency discriminator circuit 19 and the magnetic amplifier 20 could be powered from the main alternator 17, so that there would seem to be no need for the control alternator 18. However, it is found that by using the separate control alternator 18, important advantages are obtained. In particular, the control alternator 18 can be and is operative at a much higher frequency, to thereby provide the same power output with some reduction in size and weight. The higher frequency output is also of advantage in the magnetic amplifier 20 in reducing the size of components therein. Further, the speed of response of the control system is greatly increased to increase the stability of the control system. Accordingly, by providing the separate control alternator operative at a higher frequency, the overall size and weight of the assembly is decreased, while the stability is increased. It may be further noted that by using the separate control alternator 18, the operation of the control system is not effected by variations, transient, or otherwise, in the electrical output of the main alternator 17.

The alternator 18 is preferably a permanent magnet type 12 pole 2400 cycle alternator having a permanent magnet rotor 52 provided with an axial bore 53 and locked onto the end 42 of the shaft 30 by a clip and nut means 54. This particular type of unit is a pancake type unit which means that the rotor and stator are axially displaced rather than radially displaced. A radially displaced type unit can be used and a preferred form of construction is illustrated in FIGURE 4.

In the alternator 18, stator windings 55 are wound on a ring 56 which is secured to a ring 57. To adjustably support the stator assembly, a plurality of screws 58 extend through the end wall 35 and are threaded into the ring 57 with a Belleville spring 59 between the ring 57 and the end wall 35, the ring 57 together with the spring 59 being coaxially positioned on a boss 60 extending from the inner face 61 of the end plate 35. It will be appreciated that with this arrangement, the stator assembly can be positioned in properly spaced relation to the rotor 52 by adjustment of the screws 58.

The parasitic alternator 16 comprises windings 62 mounted on a laminated stator core 63 which is secured together by rivets 64. The stator 63 is installed by slipping it into the shell 34 to engage a shoulder 65, after which it is locked in place by a set screw 66. The alternator 16 further comprises a rotor assembly 67 including core pieces 68 fixed onto a sleeve 69 and assembled on the shaft 30 by being heated to expand and thence cooled to fixedly contract and secure the same into place against a shoulder 70 on the shaft.

The parasitic alternator 16 is called a flux switch type and develops an armature flux linkage which varies between equal positive and negative magnitudes, in contrast to the pulsating uni-directional flux change that occurs in the more conventional inductor alternators. There are no rotating windings and alternating current coils and direct current coils are placed alternately around on the stationary field structure. Wrapped around the field structure under each direct current coil is a copper loop made of copper sheet and silver soldered for continuous connection. These copper loops are shading coils designed to minimize the demagnetizing effects of the alternating current flux and allow the direct current to be of less value in delivering maximum magnetic flux. The parasitic alternator 16, like the control alternator 18, is preferably operated at a high frequency, and most preferably 2400 cycles per second, single phase. The alternator will deliver 0 to 200 volts, with 1000 watts output on a rectified direct current input of 0 to 30 volts, 0 to 0.5 amperes. The amplification is 15 watts direct current input to 1000 watts alternating current output.

It should be noted that the relation of the axial dimension of the stator 63 to the radial dimensions thereof is not concurrent with the optimum relations as suggested by current practices. In particular, the diameter of the stator 63 is much larger in relation to the axial dimension thereof than would be suggested. However, the illustrated design is optimum so far as providing an overall assembly of minimum size and weight.

It should be noted that a capacitor component 70a is preferably placed in series with the circuit of the parasitic load 22 and the parasitic load alternator 16 in order to develop and transfer maximum power.

Another important feature of the invention is in the bearing support for the shaft 30 whereby the bearings are secured completely within the assembly to protect them against external temperatures to which the unit is subjected. This is particularly important with respect to the bearing support adjacent the turbine 14.

In particular, thus the housing shell 34 has an internal boss or wall 71 between the load alternator 17 and the control alternator 18. This boss or wall 71 is axially bored and provided with a shoulder 72 to receive and abut the outer ring 73 of a ball bearing assembly indicated generally at 74. The ball bearing 74 is retained in place by a clamping ring 75 secured to the face of the boss or wall 71 by screws 76 threaded into appropriate apertures in the boss or wall 71 so that the ring 75 clamps the outer rings 73 of the ball bearing assembly 74. The inner race 77 of the bearing assembly snugly fits onto a reduced portion 78 of the shaft 30 and abuts a shoulder 79 thereon. Balls 80 between the races 77 adn 73 provide the bearing support.

On the other side of the main alternator 17 and between it and the parasitic load alternator 16 there is provided a second ball bearing indicated generally at 81. This bearing assembly 81 is fixed onto a boss 82 on a mounting plate 83 abutted against a shoulder 84 in the shell 34 and screwed as by screws 85 to a split ring 86 sprung into a slot 87 in the shell 34 so that a small annular abutment 88 between the slot 87 and the shoulder 84 is clamped between the ring 81 and the plate 83. The bearing assembly 81 includes an inner race 90 which is fitted onto a reduced diameter portion 91 of the shaft 30 and abuts against a shoulder 92 thereon.

Another bearing is provided between the shaft 30 and the end wall 33 in the form of a sleeve bearing 93. This sleeve bearing 93 is important in providing support for the shaft 30 but is more important in providing a block to flow of hot gas from the turbine into the alternator assembly. It is important to note that the ball bearing assembly 81 which together with the ball bearing 74 provides the main support for the shaft 30, is separated from the turbine by the sleeve bearing 93 and as well as the parasitic alternator 16, so as to be away from the temperatures of hot gas from the turbine which would tend to devastate bearing reliability.

To assemble the unit, the main alternator stator 43 is slipped into position with leads extending out through lead holes therefor and is then locked in position by the set screw 46. The split ring 86 is then sprung into the slot 87. The bearing assembly 74 is then placed in the housing and the retainer ring 75 is fastened in place by means of the screws 76. The main rotor assembly including the shaft 30, the rotor 48, the ball bearing assembly 81 and the support ring 83 is then slipped into position and the support ring 83 is clamped firmly against the shoulder 84 by the screws 85 threaded into the split ring 86. It may here be noted that this bearing support arrangement is very important in that it permits inboard positioning of the main bearing assembly 81, while allowing the unit to be easily assembled, and also permitting the use of a one-piece integral housing 34.

Either before or after the support for the bearing 81 is fixed in position in the housing, the rotor assembly 67 is heated and dropped into position on the shaft 30 and up against the shoulder 70. After the bearing assembly is fixed in the housing, the stator assembly 63 is slipped into the housing to abut the shoulder 65, and is locked in position by the set screw 66. The end plate 33 together with the sleeve bearing 93 pressed thereinto is placed on the end of the housing shell 34 and is secured thereto, care being taken to provide even clearance on the shaft 30 to eliminate rubbing.

The control alternator 18 may then be installed by installing a sleeve 94 on the shaft 30, then installing the rotor 52, then installing the clip and nut assembly 54. The stator assembly 55 is installed on the end plate 35 as illustrated which is then secured to the end of the housing shell 34. The screws 58 may then be adjusted to provide optimum spacing between the rotor 52 and the stator 55.

The turbine 14 may then be installed, first installing a slinger 95 on the shaft 30, then installing the shell 32 on the end plate 33 by means of the bolts 37, then installing the turbine rotor 38 on the shaft by means of the nut 41, and then installing the shell 31 on the shell 32.

As above indicated, an important feature of the invention is in the manner in which the sleeve 50—51 is constructed. According to this feature, the sleeve is formed from a seamless tubing, preferably of low carbon, cold-drawn iron. The tubing is cut to the appropriate length to provide a member indicated by reference numeral 96 in FIGURE 3 and then two equally spaced slots 97 and 98 are machined in the member 96. These slots 97, 98 are then welded full, with an essentially non-magnetic material, preferably with an austenitic welding material. The piece is then machined smooth on the outside and is machined on the inside to cut out material outwardly beyond the inner ends of the welds in the slots 97, 98, so that the inside surface of the resultant sleeve will be along a line indicated by dotted line 99, and the resultant member will consist of two separate semi-cylindrical members of magnetic material integrally joined by sections of essentially non-magnetic material.

It will be readily appreciated that with this method of construction, an accurately formed sleeve is readily produced.

Referring now to FIGURE 4, reference numeral 100 generally designates a modified form of control alternator. The alternator 100 is of the radial type and comprises a hub 101 which is secured on the reduced diameter portion 42 of the shaft 30 by means of the clip and nut assembly 54. Secured on the hub 101 is a rotor member of a suitable magnetic material, preferably alnico VI, which is magnetized with 12 equally spaced poles. Disposed around the rotor 102 is a sleeve 103 which preferably comprises twelve sections of magnetic material joined together by welds of essentially non-magnetic material. This sleeve is aligned over the twelve pole rotor 102 in a manner such that the center-lines of the twelve poles of the rotor 102 coincide respectively with the center line of the twelve shoes defined by the sleeve 103 in order to obtain maximum flux transfer. A preferred method of construction of the sleeve 103 will be described in connection with FIGURE 5. A stator 104 including a laminated core 105 and windings 106 is slipped into the housing 34 and secured in place by means of a set screw 107. After assembly of the alternator 100, a modified end plate 109 is secured in position on the end of the housing 34.

It may be noted that it is not absolutely necessary to use the sleeve 103, although it is preferably used in view of the highly advantageous results achieved therefrom.

This construction has several advantages over the pancake type shown in FIGURE 2. In particular, it is possible to provide a more consistent air gap and voltage performance during axial acceleration and de-acceleration, it is possible to more readily apply special windings for feed back systems, and this construction eliminates the need for spongy stator support methods such as the spring 59 and screws 58 of FIGURE 2.

Referring now to FIGURE 5, the sleeve 103 for the rotor of the control alternator 100 may be constructed in a manner similar to the sleeve for the main alternator 17 and in particular, a member 109 is cut from low carbon, cold-drawn seamless tubing, twelve equally spaced slots 110 are then cut in the member 109, and the slots 110 are then welded full using an essentially non-magnetic material, preferably an austenitic material. The outer surface may then be ground smooth, and the inner surface is then machined out to an extent such that the member 109 is divided into segments of magnetic material separated by the welds of non-magnetic material, i.e., along a line as indicated by dotted line 111 in FIGURE 5.

It will be understood that modifications and variations may be effected without departing from the spirit and scope of the novel concepts of this invention.

I claim as my invention:

In a method of constructing a permanent magnet rotor for an alternator or the like, the steps of magnetizing a cylindrical magnet to form a plurality of peripherally spaced poles, forming a sleeve member to a length substantially the same as the length of the cylindrical magnet and to an inside diameter less than the outside diameter of said cylindrical magnet, cutting axially extending grooves in said sleeve member, welding said grooves full with an essentially non-magnetic material, removing material from the inside of said sleeve member until the internal diameter thereof is substantially equal to the outside diameter of said cylindrical magnet with the sleeve member being then divided into segments of magnetic material separated by the welds of non-magnetic material, and then slipping said sleeve member on the cylindrical magnet.

References Cited in the file of this patent

UNITED STATES PATENTS

| | | |
|---|---|---|
| 1,021,266 | Rice | Mar. 26, 1912 |
| 1,254,664 | Downes et al. | Jan. 29, 1918 |
| 1,375,319 | Rae | Apr. 19, 1921 |
| 1,477,781 | Standerwick | Dec. 18, 1923 |
| 1,586,184 | Dick et al. | May 25, 1926 |
| 1,687,233 | Stoller | Oct. 9, 1928 |
| 1,960,484 | Ekstromer | May 29, 1934 |
| 2,167,355 | Gay | July 25, 1939 |
| 2,202,172 | Stoller | May 28, 1940 |
| 2,261,427 | Kuner | Nov. 4, 1941 |
| 2,539,459 | Myrmirides | Jan. 30, 1951 |
| 2,539,747 | Moore | Jan. 30, 1951 |
| 2,671,180 | Goldberg | Mar. 2, 1954 |
| 2,719,931 | Kober | Oct. 4, 1955 |
| 2,722,652 | Brainard | Nov. 1, 1955 |
| 2,743,375 | Parker | Apr. 24, 1956 |
| 2,778,960 | Anderson | Jan. 22, 1957 |
| 2,782,721 | White | Feb. 26, 1957 |

FOREIGN PATENTS

| | | |
|---|---|---|
| 474,491 | Canada | June 12, 1951 |
| 493,374 | Canada | June 2, 1953 |
| 578,934 | Great Britain | July 17, 1946 |
| 872,090 | Germany | Mar. 30, 1953 |
| 999,837 | France | Oct. 10, 1951 |